United States Patent [19]

Wilhelm et al.

[11] 3,864,574
[45] Feb. 4, 1975

[54] APPARATUS FOR MEASURING IODINE

[75] Inventors: Jürgen Wilhelm, Karlsruhe; Kurt Gerlach, Buechenau; Heinrich Mahnau, Hamburg, all of Germany

[73] Assignees: Gesellschaft fur Kermforschung mbH, Karlsruhe; Herfurth GmbH, Hamburg, both of, Germany

[22] Filed: Mar. 14, 1973

[21] Appl. No.: 341,172

[52] U.S. Cl. ............... 250/364, 250/432, 250/438
[51] Int. Cl. ............................................. G01t 1/20
[58] Field of Search ........... 250/304, 356, 363, 364, 250/380, 432, 438; 324/33

[56] References Cited
UNITED STATES PATENTS

| | | | |
|---|---|---|---|
| 2,400,940 | 5/1946 | McCollum | 324/33 |
| 2,497,823 | 2/1950 | Molloy | 324/33 |
| 2,845,136 | 7/1958 | Robinson | 324/33 |
| 2,892,091 | 6/1959 | Sawle | 250/364 |
| 3,005,100 | 10/1961 | Thompson | 250/364 |
| 3,506,402 | 4/1970 | Simon | 250/380 |

*Primary Examiner*—Harold A. Dixon
*Attorney, Agent, or Firm*—Spencer & Kaye

[57] ABSTRACT

In an apparatus for measuring a radioactive iodine isotope in air, there is provided a conduit that carries the iodine-containing air, a scintillation crystal disposed in the conduit in an axially coextensive manner and an iodine-adsorbing filter which surrounds the scintillation crystal at least along a length portion thereof and entirely fills the cross-sectional area of the conduit at any point along that length portion. The apparatus responds with substantially the same efficiency to both elemental and chemically bound iodine.

12 Claims, 1 Drawing Figure

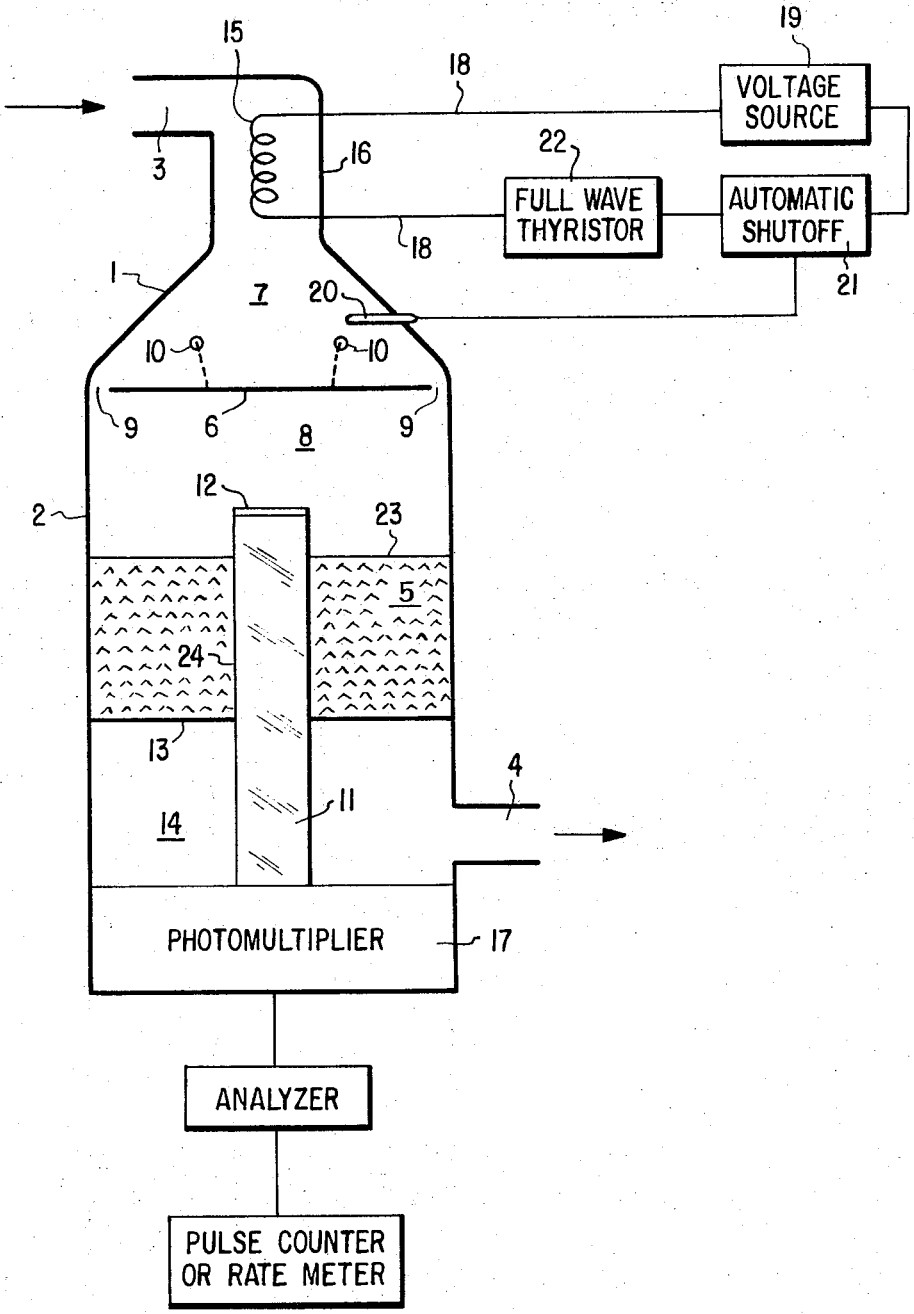

APPARATUS FOR MEASURING IODINE

BACKGROUND OF THE INVENTION

This invention relates to an apparatus for measuring iodine, particularly the radioactive iodine isotope 131, that is, the iodine nuclide of the radioactive iodine $I^{131}$ in room air by means of detecting the quantum radiation generated upon the decomposition of $I^{131}$.

For a continuous or intermittent measurement of the smallest concentration of gaseous radioactive iodine in air no apparatus is available which permits the measurement of elemental and organically bound iodine with the same degree of efficiency to make possible the determination of the actual iodine concentration in room air or air in general. The commercially available instruments which, for measuring purposes, collect the iodine on an activated carbon filter paper, practically do not separate organically bound iodine. Apparatuses in which an activated carbon filter cartridge is measured that is continuously exposed to air displays different degrees of efficiency for the two radioactive iodine components because of the substantially different behavior of elemental and organically bound iodine during separation. Since the degree of separation, for example, for methyl iodide, which is one of the organic iodine components present in air, depends to a significant degree on the relative humidity of the air, the distribution of the methyl iodide in the filter cartridge and the degree of efficiency of the measuring device are additionally a function of the relative humidity of air.

In order to obtain an iodine separation of high degree, the room air admitted to the filter must dwell therein for a relatively long period. The dwelling period is proportionate to the filter volume and inversely proportionate to the flow rate of air passing therethrough. Since this flow rate should correspond approximately to that of human breathing, the filter structures are relatively voluminous. This fact gives rise to substantial difficulties in providing a detector which has a good geometrical efficiency within reasonable technological expenditures. The utilization of a well-type scintillation counter involves very large, expensive crystals and therefore such apparatus cannot be considered practical from the economical point of view.

SUMMARY OF THE INVENTION

It is an object of the invention to provide an improved iodine monitor which permits a continuous measurement of an organically or inorganically bound radioactive iodine isotope in dry or humid room air.

This and other objects that will become apparent as the specification progresses are achieved by the improved apparatus according to the invention in which at least one scintillator is arranged axially coextensive in a conduit that carries room air. The intermediate space between the scintillator housing and the inner wall face of the conduit is entirely filled with a filter wherein the thickness of the filtering layer and its graininess are so designed that the radioactive iodine isotope which is either free or is chemically bound with substances, such as aerosols, is almost entirely adsorbed.

In order to obtain a reproducible separation of radioactive iodine even in very humid air, the relative humidity is, according to the invention, reduced by means of a temperature-controlled preheating of the room air.

By using particular, newly developed inorganic adsorbing materials such as catalysts of small inner surface (smaller than 200 m²/gram), an additional reduction of the adsorption of rare gases by a factor greater than 10 can be accomplished. The preheating of the room air and the use of the aforenoted particular inorganic adsorbing materials contribute significantly to an improvement of the measuring apparatuses of the aforesdiscussed type.

It is a further significant advantage of the apparatus according to the invention that the sensitivity along the axis of the scintillator is approximately constant provided the scintillator crystal is not too short. This constancy is of importance since a uniform detection probability for all forms of iodine is required of the scintillation detector, yet the molecular iodine and organic iodine compounds separate at substantially different depths of the filter bed.

The structure of the scintillation detector is so selected that a preadsorption of iodine in the apparatus as the iodine advances toward the adsorption bed does not occur to an appreciable extent despite the presence of the device for preheating the room air.

BRIEF DESCRIPTION OF THE DRAWING

The sole FIGURE illustrates in schematic longitudinal section a preferred embodiment of the invention.

DESCRIPTION OF THE PREFERRED EMBODIMENTS

The iodine monitor illustrated schematically in the sole FIGURE comprises a housing formed of a frustoconical upper part 1 joined by a tubular neck portion 16 and an inlet nipple 3 and a lower part or conduit 2 attached to the upper part 1 and having an outlet nipple 4. The latter may be coupled to a pump (not shown) for drawing air through the inlet nipple 3 and the conduit 2. In the conduit 2 there is positioned a filter 5 through which the air is drawn and which will be described in greater detail later. The inner space 7 defined by the frustoconical upper part 1 and the space 8 upstream of the filter 5 within the conduit 2 are separated from one another by means of a distributor disc 6 which is disposed upstream of the filter 5 and which may be secured to the upper part 1 by mounting means 10. As seen in the figure, the disc 6 is disposed substantially normal to the conduit axis. Between the periphery of the disc 6 and the wall of the upper and lower parts 1 and 2 there are provided openings 9 through which the room air may flow from the inner space 7 to the inner space 8. Instead of the distributor disc 6 a sieve or similar component may be used for ensuring a uniform distribution of the room air as it flows from the inner space 7 of the upper part 1 into the inner space 8 of the lower part or conduit 2.

The filter 5 may be an activated carbon filter cartridge in which the graininess and the thickness of the filtering layer are either calculated or experimentally determined to ensure that the iodine is substantially entirely adsorbed in either its elemental, or its chemically bound form, or both. The activated carbon filter 5 may also be specially impregnated so that organic iodine compounds such as methyl iodide ($CH_3I$) may also be adsorbed thereby. In the alternative, the filter material may be a special catalyst on the basis of $SiO_2$, impregnated with $AgNO_3$.

The filter cartridge 5 is provided with an axial opening 24 into which there is fitted, with both ends protruding, a scintillation crystal 11 which is a sodium iodide (Tl) crystal disposed in a thin-walled tube having a solid base portion 12 oriented towards the distributor disc 6. In the preferred embodiment the scintillation crystal 11 is situated coaxially with the conduit 2. At the other end of the scintillation crystal 11 remote from the base 12 there is arranged a photomultiplier 17 with a single-channel analyzer, a rate meter or pulse counter (not shown).

Photomultiplier: XP 1,000 Valvo G.m.b.H. Hamburg
single-channel analyzer: E 10 Herfurth G.m.b.H. Hamburg
ratemeter: E1/A-11 Herfurth G.m.b.H. Hamburg
pulse counter: Mod. 206 EBM Elektronik Krohn KG Norderstedt The scintillation crystal 11 may be movable in the opening 24 with respect to the filter 5.

The intermediate annular space between the outer face of the scintillation crystal 11 and the inner wall face of the lower part 2 of the iodine monitor is occupied entirely by the filter 5. Stated in different terms, the filter 5 entirely surrounds the scintillator 11 along a length portion thereof and the entire cross section of the conduit 2 taken at any point of that length portion is entirely filled out by the filter 5. By virtue of the protrusion of the scintillation crystal 11 beyond the filter 5 towards the photomultiplier 17, between the latter and the underface 13 of the filter 5 there may be provided a collecting chamber 14 for the room air drawn through the filter 5. The collecting chamber 14 is in communication with the air outlet nipple 4. Thus, the photomultiplier 17, as it also may be observed from the FIGURE, is disposed, as viewed in the direction of gas flow, downstream of the filter 5 in a space within the conduit 2 at an end of the crystal 11 to detect its flashes.

The room air or ambient air which is admitted through the air intake nipple 3 into the upper part 1 of the iodine monitor is brought to a relative humidity below or up to 100% by means of a heater coil 15 which is disposed in the tubular housing portion 16 and is supplied with electric current through conductors 18 connected to an a.c. voltage source 19 through a full wave thyristor 22. The room air within the upper part 1 of the iodine monitor is heated preferably to a temperature of 45°C. The temperature control is effected by a thermostatic device having a temperature sensor 20 which may be situated in the inner space 7 of the upper part 1 and an automatic shut-off device 21 to which the sensor 20 is coupled. When the desired temperature necessary for the predetermined relative humidity in the inner space 7 is achieved, the device 21 de-energizes or energizes, as the case may be, the heater coil 15 through the full wave thyristor 22.

The preheated air which thus has a predetermined relative humidity, then passes through the openings 9 and impinges in an evenly distributed manner on the upper face 23 of the filter 5. It is noted here that the apertured distributor disc 6 is so designed that the room air, as it passes from the space 7 into the space 8 does not directly impinge on the scintillation crystal 11. From the surface 23 the air travels through the filter in which the elemental iodine and the chemically bound iodine (such as methyl iodide) are adsorbed at different depths of the filtering layer. The zone in which elemental iodine is adsorbed has a depth of a few millimeters measured from the upper face 23 of the filter 5, while the methyl iodide is adsorbed at a depth up to approximately 2 cm.

The scintillation crystal 11 and the filter 5 are arranged in such a manner with respect to one another that the scintillation crystal 11 is equally senstive to the gamma quantum radiation emanating from the nuclide of radioactive iodine, such as $I^{131}$ in the adsorption zone for elemental iodine and to the radiation from the adsorption zone for the organically bound iodine.

The light flashes generated in the scintillation crystal by the gamma quantum radiation are registered by the photomultiplier 17 and evaluated by a single-channel analyzer and a flow rate meter.

It is a particular advantage of the aforedescribed apparatus that the relative humidity of air may fluctuate in a range of 40 to 100% without substantially affecting the degree of separation of the adsorber. The degree of separation is computed from the proportion of the activity separated in the filter 5 to the total activity, whereby the activity is generated by the gamma quantum radiation with an energy of 0.36 MeV.

For the measurements given hereinafter, the iodine monitor was checked out under laboratory conditions. The flow rate of air passing through the iodine monitor was 1.8 m³/hour which corresponds to the normal breathing rate of a human adult. After an optimization of variables, such as the dimensions and positioning of the iodine adsorber, the temperature (and its maintenance at a constant value) of the room air in the upper part 1 of the iodine monitor for achieving a satisfactory dew point spacing during measurements of iodine in damp air and the dimensioning of the channel width of the single-channel analyzer (not shown), the following data were obtained:

| Relative humidity of air in % | $I^{131}$ activity in nCi | Useful rate pulse/sec | Null rate pulse/sec | Efficiency $\eta$ of the detector in % | Separation $\epsilon$ of the adsorber in % |
|---|---|---|---|---|---|
| 40 – 60 | 528 (CH₃I) | 582 | 8 | 3.0 | > 99.9 |
| do. | 4000 do. | 4150 | 6 | 2.8 | 99.98 |
| > 100⁺⁾ | 28 do. | 35 | 18 | 3.4 | 90.6 |
| 95 – 100 | 108 do. | 147 | 8 | 3.7 | 99.72 |
| > 100 | 156 do. | 247 | 23 | 4.3 | 98.0 |
| 95 – 100 | 530 do. | 696 | 4 | 3.6 | 99.81 |
| 40 – 60 | 59 (I₂) | 72 | 12 | 3.3 | > 99.9 |
| do. | 61 do. | 68 | 16 | 3.0 | > 99.9 |
| do. | 73 do. | 104 | 16 | 3.9 | > 99.9 |
| do. | 80 do. | 94 | 16 | 3.2 | > 99.9 |

An effect of derivative products of radon and thoron on the null effect of the iodine monitor could not be detected in the above-identified apparatus during the course of its operation prior to the admission of iodine (the prerun period with air flow was up to 26 hours). After exposing the iodine adsorber (filter) 5 with radioactively tagged methyl iodide $CH_3I$ or iodine $I_2$ of given activity, and after charging in the μg range, the iodine monitor was examined under laboratory conditions. The temperature of the ambient air was between 22 and 27°C. During the experiments with damp air of 95 to 100% relative humidity the iodine adsorber was, already before the introduction of iodine, in a water vapor adsorption balance with the humidity of the inflowing damp air.

The separation degree $\epsilon$ of the iodine adsorber 5 had in all experiments a value of over 99.7% as long as a relative air humidity of 100% was not exceeded. In case of the measurement of iodine concentration in room air for the purposes of protection against radiation, this means a practically complete separation of the iodine in the iodine monitor, independently from the chemical form of the iodine. Consequently, an introduction of the separation $\bar{\epsilon}$ in the formula given below may be dispensed with.

The efficiency $\bar{\eta}$ of the iodine monitor amounts to 3.4%. In addition to the degree of efficiency, the sensitivity of the iodine detection and the accumulation period are, until an alarm threshold is reached, dependent of the iodine concentration in the inflowing room gas and the height of the null rate. The alarm threshold is given hereinafter as the X-fold of the null rate.

For the period $t$ that lasts until the alarm threshold is reached by the accumulation of activity in the iodine adsorber, the following formula applies:

$$t = (x-1) \cdot R_o \cdot k \cdot 100/c \cdot v \bar{\eta} = [(x-1) \cdot R_o \cdot 8.0 \cdot 10^{-10}/c \cdot v](h),$$

wherein $x$ is the factor which designates the height of the alarm threshold as a multiple of the null rate;
$R_o$ is the null rate in pulse/sec. ;
$k$ is $1/3.7 \times 10^{10}$;
$c$ is the $I^{131}$ concentration in air in $Ci/m^3$;
$v$ is the flow rate of air through the detector expressed in $m^3/hour$;
$\bar{\eta}$ is the mean efficiency of the iodine detector in %.

For an $I^{131}$ concentration in room air of $6 \times 10^{-9}$ $Ci/m^3$ (which is the permissible value of concentration in the control range according to the first German Radiation Protection Law), an air flow of 1.8 $m^3/hour$, a null rate of 8 pulses/sec. and an alarm threshold in the height of three times the null rate, there is obtained an accumulation period $t$ of 1.2 hours up to the point where the alarm threshold is reached.

During the aforenoted period a human adult would have inhaled at the most the same amount of $I^{131}$ as that separated in the iodine adsorber.

The following formula applies:

$A_{inhaled} = t.c.v.;$

Substituting the numerical values, one obtains:

$A_{inhaled} = 12.9 \times 10^{-9}$ Ci.

Of this activity approximately 3 $nCi$ affects the thyroid of a person. This value is below the permissible continuous thyroid exposition of 140 $nCi$ for persons regularly exposed to radiation due to their job.

The sensitivity of the iodine monitor may be substantially increased by providing a screening from external quantum radiation.

It will be understood that the above description of the present invention is susceptible to various modifications, changes and adaptations, and the same are intended to be comprehended within the meaning and range of equivalents of the appended claims.

We claim:

1. An apparatus for measuring the radioactive iodine isotope 131 in air by means of detecting the quantum radiation generated by the decomposition of said iodine, said iodine being present in air in elemental and chemically bound form, comprising:
   a. a conduit carrying air containing said iodine, said conduit having an inner wall face;
   b. a scintillator disposed in said conduit and oriented in an axially coextensive relationship therewith;
   c. a filter for adsorbing said iodine in its elemental form and in its chemically bound form, said filter entirely surrounding at least one length portion of said scintillator and fully occupying the entire cross section of said conduit between said scintillator and said inner wall face along any point of said length portion; and
   d. means provided in said conduit downstream of said filter for accommodating a photomultiplier at an end of said scintillator, said end being situated downstream of said filter.

2. An apparatus as defined in claim 1, further comprising a distributor means in said conduit upstream of said filter for uniformly distributing the gas prior to its passage through said filter.

3. An apparatus as defined in claim 2, said conduit having an axis; said distributor means being constituted of a disc disposed substantially normal to the conduit axis.

4. An apparatus as defined in claim 1, further comprising a photomultiplier disposed in said conduit downstream of said filter and adjoining said scintillator.

5. An apparatus as defined in claim 1, including a thin-walled tubular housing containing said scintillator.

6. An apparatus as defined in claim 1, wherein said scintillator is a sodium iodide (Tl) scintillation crystal.

7. An apparatus as defined in claim 1, wherein said filtering layer is made of impregnated activated carbon.

8. An apparatus as defined in claim 1, wherein said filtering layer is made of a $SiO_2$ catalyst impregnated with $AgNO_3$.

9. An apparatus as defined in claim 1, wherein said scintillator is disposed coaxially with respect to said conduit.

10. An apparatus as defined in claim 1, wherein said scintillator is movably arranged in said filter and projects beyond opposite faces thereof.

11. An apparatus as defined in claim 1, further including heating means for preheating said air in said apparatus upstream of said filter to set the relative humidity of said air to a predetermined value.

12. An apparatus as defined in claim 11, said heating means including a heater coil and a thermostatic circuit means connected thereto for maintaining constant said predetermined value.

* * * * *

UNITED STATES PATENT OFFICE
CERTIFICATE OF CORRECTION

PATENT NO. : 3,864,574
DATED : February 4th, 1975
INVENTOR(S) : Jürgen Wilhelm et al It is certified that error appears in the above-identified patent and that said Letters Patent are hereby corrected as shown below:

In the heading of the patent, under [73] Assignees:, change "Kermforschung" to --Kernforschung--.

Column 2, lines 6 and 7, change "aforesdiscussed" to --aforediscussed--.

Column 3, line 8, delete "(not shown)".

Column 5, line 30, change "$10^{-10}/c \cdot v](h)$" to --$10^{-10}/c \cdot v](h)$--.

Signed and sealed this 24th day of June 1975.

(SEAL)
Attest:

RUTH C. MASON
Attesting Officer

C. MARSHALL DANN
Commissioner of Patents
and Trademarks